(12) United States Patent
Baum et al.

(10) Patent No.: US 10,690,535 B2
(45) Date of Patent: Jun. 23, 2020

(54) DYNAMIC SCALE FOR FLAT GOODS TRANSPORTED ON THEIR SIDES, AND METHOD FOR CONTROL THEREOF

(71) Applicant: Francotyp-Postalia GmbH, Berlin (DE)

(72) Inventors: Volker Baum, Berlin (DE); Frank Geserich, Friedrichsthal (DE)

(73) Assignee: Francotyp-Postalia GmbH, Berlin (DE)

( * ) Notice: Subject to any disclaimer, the term of this patent is extended or adjusted under 35 U.S.C. 154(b) by 328 days.

(21) Appl. No.: 15/800,340

(22) Filed: Nov. 1, 2017

(65) Prior Publication Data

US 2018/0120146 A1 May 3, 2018

(30) Foreign Application Priority Data

Nov. 1, 2016 (DE) .................. 20 2016 106 125 U
Dec. 15, 2016 (DE) ........................ 10 2016 124 471

(51) Int. Cl.
*G01G 19/00* (2006.01)
*G01G 11/04* (2006.01)
(Continued)

(52) U.S. Cl.
CPC ............. *G01G 19/002* (2013.01); *B65H 7/14* (2013.01); *G01B 11/043* (2013.01);
(Continued)

(58) Field of Classification Search
CPC ...... G01G 11/003; G01G 11/04; G01G 11/12; G01G 19/002; G01G 19/005; G01G 23/00;
(Continued)

(56) References Cited

U.S. PATENT DOCUMENTS

| 4,848,492 A * | 7/1989 | Hubbard | G01G 11/003 177/210 FP |
| 5,046,570 A * | 9/1991 | Emme | A47F 9/046 177/145 |

(Continued)

*Primary Examiner* — Natalie Huls
(74) *Attorney, Agent, or Firm* — Schiff Hardin LLP

(57) ABSTRACT

In a dynamic scale for flat goods on their sides, and a control method therefor, flat goods are transported with a continuous counting of encoder pulses, and a weight measurement of a moving flat good is started when the trailing edge of the flat good has reached a first sensor. A first count state of the counter is stored when the leading edge of the flat good reaches a second sensor but a valid weight measurement result is not present. A weight measurement takes place with a transport velocity reduced in steps. After a step-down of the transport velocity of the flat good a subsequent weight measurement is performed with a next lowest transport velocity, and the current counter state is then queried if neither a valid weight measurement result exists, nor can it be established that the trailing edge of the flat good has reached the first sensor, although the leading edge of that flat good has reached the second sensor, as well as a check shows the current counter state corresponds to the sum of the stored counter state and a predetermined count value. The querying steps after the check are repeated as long as the current counter state has not yet reached the sum, and with an additional step-down of the transport velocity of the flat good and weight measurement result, until the check shows the current counter state has reached the sum.

15 Claims, 6 Drawing Sheets

(51) Int. Cl.
*G01G 23/00* (2006.01)
*B65H 7/14* (2006.01)
*G01G 11/00* (2006.01)
*G01G 11/12* (2006.01)
*G01B 11/04* (2006.01)
*G01B 11/06* (2006.01)
*G01D 5/347* (2006.01)

(52) U.S. Cl.
CPC ........ *G01B 11/046* (2013.01); *G01B 11/0691* (2013.01); *G01D 5/347* (2013.01); *G01G 11/003* (2013.01); *G01G 11/04* (2013.01); *G01G 11/12* (2013.01); *G01G 19/005* (2013.01); *G01G 23/00* (2013.01); *B65H 2511/11* (2013.01); *B65H 2701/1311* (2013.01); *B65H 2701/1313* (2013.01); *B65H 2701/1916* (2013.01)

(58) Field of Classification Search
CPC .............. B65H 7/14; B65H 2701/1311; B65H 2701/1313; B65H 2701/1916; G07B 17/00467; G07B 2017/00701
See application file for complete search history.

(56) References Cited

U.S. PATENT DOCUMENTS

| | | | | |
|---|---|---|---|---|
| 5,230,391 | A * | 7/1993 | Murata | G01G 11/00 177/145 |
| 5,635,679 | A * | 6/1997 | Kohashi | G01G 19/035 177/1 |
| 6,265,675 | B1 | 7/2001 | Hubler et al. | |
| 6,472,616 | B2 * | 10/2002 | Thiel | G01G 19/4148 177/25.13 |
| 6,559,391 | B2 * | 5/2003 | Huebler | G01G 19/005 177/121 |
| 6,630,632 | B2 * | 10/2003 | Huebler | G01G 19/005 177/25.15 |
| 6,947,912 | B1 * | 9/2005 | Huebler | G01G 19/4148 177/119 |
| 7,358,450 | B2 * | 4/2008 | Hubler | G01G 19/005 177/121 |
| 8,698,012 | B2 * | 4/2014 | Huebler | G01G 19/005 177/145 |
| 8,969,743 | B2 * | 3/2015 | Huebler | G01G 19/005 177/145 |
| 9,739,656 | B2 * | 8/2017 | Kieser | G01G 11/16 |
| 2001/0015291 | A1 | 8/2001 | Huebler et al. | |
| 2010/0187021 | A1 * | 7/2010 | Giro Amigo | B65B 1/32 177/1 |

* cited by examiner

DYNAMIC SCALE FOR FLAT GOODS TRANSPORTED ON THEIR SIDES, AND METHOD FOR CONTROL THEREOF

BACKGROUND OF THE INVENTION

Field of the Invention

The invention concerns a method for controlling a dynamic scale for flat goods transported lying on their side, and an arrangement for implementing such a method. The flat goods transported on their sides are, for example, pieces of mail such an enveloped letters or postcards, but another type of flat good is not excluded. Such a dynamic scale is used in a goods processing system, such as a modular station of a mail route of a franking system.

Description of the Prior Art

The mail route of a franking system is typically composed of a number of mail piece processing stations arranged individually in series. A placement station is upstream of the individualization station, often at the start of the mail route, and serves for the placement of individual or stacked mail pieces at the individualization station, which individualizes the stack. The individualized mail pieces are supplied via the dynamic scale to a franking machine and then are stored in a tray station.

A dynamic scale of the Jetmail® franking system is known from the European patent EP 974 819 B1. Pieces of mail (letters) that are transported standing on edge are supplied to the dynamic scale. The letter to be weighed should be located entirely and alone on a weighing pan of the scale in order to achieve a sufficiently precise and error-free weight measurement. The length of the weighing pan is thereby determined by the transport velocity, the longest letter to be weighed, and an additional measurement route. However, the gap between the longest letters is so large that a high letter throughput cannot be achieved. The throughput is oriented toward a standard letter because the gap is then smaller. However, only 50 lpm (letters per minute) is thus achieved. Although the throughput can theoretically be further raised by increasing the transport velocity of the letters through a correspondingly controlled transport unit of the dynamic scale, the transport velocity must also be adapted to the remaining mail piece processing stations of the entire franking system. It would be disadvantageous if the multiple stations or modules of the entire franking system would need to be reworked in this regard.

Known from European patent EP 1014050 B1 are a method and an arrangement for controlling a dynamic scale that has two operating modes. In the dynamic operating mode, a rotation speed regulation is active before a beginning of a measurement time period, which rotation speed regulation is, however, deactivated during the measurement time period and is only activated again given a mail piece located at the outlet of the scale. In the case of a drive motor that is not strong enough, friction resistances act on the at least one transport belt of the transport device, which can interrupt the initial motor rotation speed specifically given heavy mail pieces within the measurement time period. Only a small measurement time increase for large-format mail pieces results from this passive braking to a lower transport velocity, which time increase is sometimes insufficient to achieve valid measurement value. Therefore, after halting the transport of the transported flat good, the latter is transported back to the weighing pan again, stopped again, and the system switches over to a static operating mode of the scale, and then the flat good is transported out of the scale. The transport mechanism must support the transport in both directions; moreover, the time cost for the repeat procedure is relatively high. Due to the passive braking, the manner in which the mail pieces are treated depending on their format and/or weight cannot be definitely reproduced for all scales.

A method and dynamic scale are known from European patent EP 1014051 B1. The scale has two sensors and, respectively at the input and output of the dynamic scale. A weighing mode can be manually selected from a number of different weighing modes before the weighing. A transport velocity that is chosen too high may lead to an invalid measurement result. During the dynamic weighing, a switching of the transport velocity to a lower, predetermined value, and possibly to zero for static weighing, may take place. Assuming a high transport velocity upon halting the transport, an unwanted further transport of the transported flat good occurs. However, a sudden halt is not possible due to the stored kinetic energy of the transported flat good and the energy stored in the drive motor. So that the weight measurement is not imprecise, an intended static weighing must be terminated in the event that the center of gravity of the flat good is too far apart from the center of gravity of the weighing pan if the flat good ultimately comes to a standstill too late. As a result of this, the flat good must be transported back by a path segment. Processing time that could be used for weighing is lost given such return transport.

From European patent EP 1189041 B1, a dynamic scale is known that has a processing station arranged upstream in the transport path of the scale, wherein a number of sensors for determining a dimension of a mail piece are arranged in the station. An automatic switching into a second operating mode for semi-dynamic operation of the scale with static weighing takes place, the switching taking place depending on the result of a determination of the dimensions of the subsequent mail piece delivered to the scale in a first processing station arranged upstream in the mail flow. A return transport of the mail piece is unnecessary if it is not transported too far on the weighing pan for the purpose of a semi-dynamic weighing, but how this is accomplished is not described in the aforementioned patent. If the processing station is to be used in a mail route without dynamic scale, it is disadvantageous that either all processing stations would need to be equipped with a number of sensors for determining a dimension of a mail piece, or two different types of processing stations would need to be produced, which in each instance increases the material, financial and organizational cost for such a processing station.

A dynamic scale of the Centormail® franking system is known from the German patent DE 10 2011 100 176 B4 and has two cascaded weighing units, through which a letter standing on edge passes with a transport velocity of 680 mm/s. Given standard letters, up to 90 lpm is achieved. Moreover, all additional letter formats may be dynamically processed. However, the material and financial cost is relatively large.

German patent application DE 102010009431 A1, discloses a fast dynamic scale and a method to control the dynamic scale, in addition to a weighing unit having a shortened length that is effective for the weighing of standard letters, has a switchable takeoff device for items that are transported standing on edge, such as letters in envelopes. Standard letters are those letters of Deutsche PostAG having a format of (90 mm to 125 mm×140 mm to 235 mm) and constitute the majority of the letter volume. As used herein, the term "standard letter" means the C6 long format (235 mm in length) according to DIN and US10 format (241 mm in length) according to the US standard. The weighing unit is composed of a weighing cell, a weighing pan having a transport mechanism, and a first motor to drive the transport mechanism, wherein transport mechanism with the motor being arranged on the weighing cell. The weighing cell is loaded with a preload, and has a first sensor that is arranged across the axis of a first deflection roller of the transport mechanism at the beginning of the weighing unit, and that emits a first signal to a control processor, which starts the weighing process for an item. A second sensor is arranged in a position near the middle of the weighing unit, in the transport direction, and emits a second signal to the control processor, which generates a communication that an item following the item currently being weighed may be supplied. Three motors may be activated and five sensors may be queried by the control processor in order to determine the position of the item. The scale requires a high material cost, and the complicated control method is disadvantageous. The method then also includes a) activation of the takeoff device when the weighing process has not ended; b) stopping of the transport of the item in the scale; c) transport of the item back to the weighing unit; d) static weighing of the item; e) further control of the weighing unit and the takeoff device to eject the item.

In a dynamic scale of the CentorMail™ franking system, during the transport of the letter at 680 mm/s it is continuously sought to determine a stable weight for this letter. If that is not achieved before the letter leaves the weighing region (which is signaled by closing the outlet photoelectric barrier), the following steps are executed:

1. the transport is stopped,
2. the transport in the reverse direction is started,
3. the transport is stopped again as soon as the letter has been transported back onto the weighing region again (outlet sensor is free again),
4. a static weighing is performed,
5. the transport in the transport direction is started again at system velocity in order to transport the letter into the following apparatus.

The transport mechanism must disadvantageously support a transport in both directions; moreover, the time cost for the repeat procedure is relatively high.

SUMMARY OF THE INVENTION

An object of the invention is to provide a method and an arrangement for controlling a dynamic scale for flat goods on their sides, which do not exhibit the aforementioned disadvantages. The dynamic scale should be of optimally simple design, and it should be possible to manufacture it cost-effectively, and it should be able to manage without a return transport of the flat good, such that the goods processing time required by the dynamic scale is minimized and therefore the throughput of flat goods is increased. The method should be reproducible depending on valid weight measurement values for all flat goods, independently of their format. A dynamic scale with only one weighing cell and with a takeoff device for flat goods transported on their sides should be achieved, and the number of sensors and motors should be minimized in order to allow a simple and identical control method of the dynamic scale for all letter formats, from postcards of 140 mm in length up to the B4 format of 353 mm in length, as well as for different letter thicknesses.

The method for controlling a dynamic scale for flat goods on their sides includes controlling the transport of the flat goods with continuous counting of encoder pulses, as well as a weight measurement of a moving flat good, which is started when the trailing edge of this flat good reaches a first sensor. A first counter state of the counter is stored if the leading edge of a flat good reaches a second sensor but no valid weight measurement result is present. A step of the method is then reached in which a weight measurement with a transport velocity that is reduced step-by-step takes place. After a step-down of the transport velocity, a subsequent weight measurement is performed with a next lowest transport velocity, and the current counter state is then queried if neither a valid weight measurement result is present, nor can it be established that the trailing edge of the flat good has reached the first sensor, although the leading edge of a flat good has reached a second sensor, and a check as to whether the current counter state corresponds to a sum of the stored counter state and a predetermined count value. After the check, a repetition of the querying and the aforementioned method step takes place as long as the current counter state has not yet reached the sum, and with an additional step-down of the transport velocity of the flat good and validity check of the weight measurement result in at least one additional step, if the current counter state reaches the sum.

In detail, the method for controlling a dynamic scale for flat goods lying on their side includes the following steps:

a) provide a weighing plate that has a transport device for a flat good transported lying on its side, which flat good is transported in the transport direction x of a Cartesian coordinate system during the weighing, and provide an encoder and a counter to count encoder pulses in time intervals during the driving of the transport direction, b) provide a takeoff device to take the flat good off of the weighing plate, c) provide a first sensor in a first section of the supply deck in the intake, and sensors in the outlet of the dynamic scale, to detect the position of a flat good, d) provide a covering for a width sensor that forms a third section of the supply deck between the weighing plate and the takeoff device, which third section allows the weighing plate to be shortened in a second section of the supply deck, e) provide a control unit to detect sensor signals and output control signals, provided to i) detect that the leading edge of the flat good has reached a position of a first sensor, wherein the position lies directly at an edge of the weighing plate, upstream in terms of the flow of goods in a transport path, ii) detect that the trailing edge of the flat good has reached a position of the first sensor, wherein the position lies directly at an edge of the weighing plate, upstream in terms of the flow of goods in a transport path, iii) detect that the leading edge of the flat good has reached a position of a second sensor, wherein the position lies directly at an edge of the weighing plate, downstream in terms of the flow of goods in a transport path, iv) detect that the leading edge of the flat good has reached a position of a third sensor, wherein the position lies directly at an edge of the weighing plate, downstream in terms of the flow of goods in a transport path, and v) activate a first motor of the transport device in order to transport [the] flat good along the transport path with a first transport velocity, wherein the operation of the first motor is monitored with the encoder, vi) count encoder pulses at time intervals during the driving of the transport device for a flat good, vii) weigh and evaluate the weight measurement result, wherein given a valid weight measurement result the first motor of the transport device is activated in order to keep the first transport velocity constant, wherein a first count state of the counter is stored upon determining an invalid weight measurement result, viii) weight measurement at reduced transport velocity given an invalid weight measurement result, wherein the first motor of the transport device is activated in order to reduce the first transport velocity by at least one step to at least a second transport velocity, and in order to subsequently hold this constant, and continuation of the weight measurement of the moving flat good, ix) check whether a valid weight measurement result is present after the trailing edge of the flat good has reached the position of the first sensor, wherein the current counter state of the counter is queried if neither a valid weight measurement result is present nor has the trailing edge of the flat good reached the position of the first sensor, x) determine whether the current counter state W of the counter corresponds to a sum of the stored first counter state and a predetermined count value, and repeat steps viii) and ix) of a weight measurement given a transport velocity reduced step-by-step given an invalid weight measurement result, xi) reduce the transport velocity to zero mm/sec, and static weight measurement, wherein then an error message is output if no valid weight measurement result is present within a defined time period, xii) activate the first motor in order to transport the flat good further in the transport direction at the first transport velocity, and check whether the leading edge of the flat good has reached the position of the third sensor, xiii) send out a message to the control unit of the dynamic scale about a readiness for the supply of a next flat good via an upstream supply station, and xiv) activate a second motor to drive a takeoff roller of the takeoff device to take a flat good off of the weighing plate.

An arrangement for controlling a dynamic scale for flat goods lying on their side, has a computer that controls the transport of the flat goods; a counter formed by memory cells of the computer and that continuously counts encoder pulses; and scale that makes a weight measurement of a moving flat good, that is started if the trailing edge of the flat good has reached a first sensor, with additional memory cells for storing a first count state of a counter if the leading edge of a flat good reaches a second sensor but no valid weight measurement result is present. The computer causes a weight measurement takes place with a transport velocity reduced step-by-step, wherein after a step-down of the transport velocity of the flat good a subsequent weight measurement is performed with a next lowest transport velocity. Then the current counter state is queried and stored in additional memory cells if neither a valid weight measurement result is present, nor can it be established that the trailing edge of the flat good has reached the first sensor although the leading edge of a flat good has reached a second sensor, and with a check as to whether the current counter state of the counter corresponds to a sum of the stored first counter state and a predetermined count value. The querying and weighing controlled by the computer are repeated as long as the current counter state of the counter has not reached a sum of the stored first counter state and a predetermined count value; with an additional step-down of the transport velocity of the flat good and validity check of the weight measurement result if the current counter state of the counter reaches a sum of the stored first counter state and a predetermined count value.

The dynamic scale uses a shortened weighing plate that is optimized for weighing standard mail, and has a transport device. The control method used utilizes three sensors, preferably optoelectronic sensors that are respectively designed as one-way photoelectric barriers. In a receiver installed on a base plate, such optoelectronic sensors have a phototransistor or a photodiode that transduces the light emitted by the transmitter (preferably a light-emitting diode (LED)) into an electrical current using the photoelectric effect as long as the light beam is not interrupted. The current is converted into an analog voltage that may be evaluated by the computer after conversion into a digital voltage value. The computer is a component of a control system of the dynamic scale. The computer also forms the counter that counts the pulses of the encoder as of the start of the driving of the transport device. A dynamic weighing process is started if the trailing edge of a supplied flat good is detected by a first sensor, and thus the good rests individually and entirely on the weighing plate. The first sensor is preferably realized as a one-way photoelectric barrier that is therefore also called an inlet photoelectric barrier. The weight measurement result is checked for validity if the leading edge of the flat good is detected by the computer with the use of a second sensor. The weight measurement results are stable if the standard deviation of a sequence from a number N of successive measurement values is low; the weight measurement result is then considered as valid. The second sensor is downstream, in terms of the flow of goods, from the weighing plate on the base plate of the dynamic scale, and likewise has a photoelectric barrier, which therefore is referred to as an outlet photoelectric barrier. In the dynamic scale according to the invention, in the transport direction, the light beam of the second sensor is after the middle of the transport path through the scale, at an optimally small distance, preferably immediately at the border of the downstream edge of the weighing plate in terms of the flow of goods.

Given invalidity of the weight measurement result, a first count state of the counter is stored. The pulses of the encoder are initially counted further up to a second count state that corresponds to a predetermined distance from the light beam. The counter and the second sensor are thus provided in order to cause the computer to operate the transport drive in order to reduce the velocity of the transported flat good step-by-step as of a predetermined distance from the light beam of the photoelectric barrier, and possibly in order to be able to successfully brake the transported flat good in the event that no valid weight measurement result is present. During the weighing, a switching of the transport velocity in multiple steps to a lower predetermined value takes place as needed for dynamic weighing, and possibly a braking to zero for static weighing. The step width within the transport path is in the form of a predetermined number of encoder pulses, and the step height in the switching of the transport velocity is electronically stored in a memory of the computer of the dynamic scale as a nominal rotation speed for each of the steps. Upon each switching of the transport velocity, a down-regulation of the motor rotation speed takes place corresponding to the stored step height. To brake the transport velocity to zero, an active braking takes place that can be reproduced for every flat good in the dynamic scale. To implement the active braking, a brake circuit is provided that can be connected in parallel with the motor inductance. Braking of the flat good to zero is thus already achieved at a distance of 55 mm from the light beam of the photoelectric barrier of the second sensor. At the output, a third sensor is provided that is arranged at a distance of preferably 75.73 mm from the second sensor in the transport direction, in a takeoff device.

The dynamic scale for a flat good transported on its side moreover has a weighing plate with a transport device, also a supply deck as well as the takeoff device. The supply deck is subdivided into four subsections that adjoin one another in series. A first subsection of the supply deck is situated in the input area of the dynamic scale. A weighing plate in a middle, second subsection of the supply deck is situated as a load on a single weighing cell. The weighing plate length in the second subsection of the supply deck is optimized for flat goods having a standard format, such that for this optimally small gaps are generated between the flat goods, and a maximum throughput of flat goods per minute is achieved. A cover for a width sensor follows in a middle, third subsection. The two middle subsections together enable a dynamic processing of longer flat goods, for example of long formats up to the B4 letter format, wherein the third subsection is designed so that a long flat good (which, for example, has the B4 format) does not contact the third subsection upon leaving the second subsection. The three sensors of the dynamic scale are electrically connected with the control computer of the dynamic scale in order to receive sensor signals. The control computer is also provided to provide activation signals to the motors, with a first motor arranged in the takeoff device. The supply deck has openings for a first and third sensor. A second sensor is arranged at a distance from the first sensor in the transport direction x, after the output-side transversal edge of the weighing plate, wherein the distance corresponds to a first length; and that a third sensor is arranged immediately adjacent to the alignment wall at the output of the scale and at a second distance from the second sensor in the transport direction, wherein the distance corresponds to a second length, and wherein the first distance is greater than the second distance. In the transport direction, the weighing plate has a length such that a short flat good may rest entirely on the weighing plate and nevertheless, within the first length, may be transported a partial path section in the transport direction with a first transport velocity by the transport device of the dynamic scale, while the total weight of the flat good, the transport device, the weighing plate and a frame on which the weighing plate rests on a load introduction point of the weighing cell, is weighed by the weighing cell.

In contrast to this, a long flat good may project beyond the edge of the weighing plate without contacting the third subsection of the supply deck. A long flat good should rest with its center of gravity still on the weighing plate while it is transported further with a second transport velocity in the transport direction. The maximum length of such a long flat good is smaller than the sum of first and second length, thus the distance of the third photoelectric barrier from the first photoelectric barrier; the longest flat good is especially also weighed dynamically, meaning that it must be transported through a partial path section in the transport direction during the weighing, but with a very low n-th transport velocity. An ejection roller and at least one contact pressure finger form a simple takeoff device that is arranged near the output of the dynamic scale. The takeoff device is likewise installed on the base plate of the dynamic scale. The ejection roller is driven by the second motor at system velocity. A second flat good may be supplied to the dynamic scale while the first flat good is detected by the takeoff device and transported to the output of the dynamic scale. For dimension measurement, a width measurement assembly may be situated below the middle third subsection of the supply cover, a thickness measurement assembly to determine the length of the flat good may be situated in the first subsection of the supply cover, and a thickness measurement assembly to determine the thickness of a flat good may be situated at the input of the dynamic scale in the second subsection of the supply deck.

It is advantageous that the switching of the transport velocity in multiple steps enables a more certain halting of the transport belt as needed without the transported flat good sliding further and coming to rest too late.

BRIEF DESCRIPTION OF THE DRAWINGS

FIG. 4$b$ is a simplified diagram of a second embodiment of the control computer.

DESCRIPTION OF THE PREFERRED EMBODIMENTS

Figure 1:
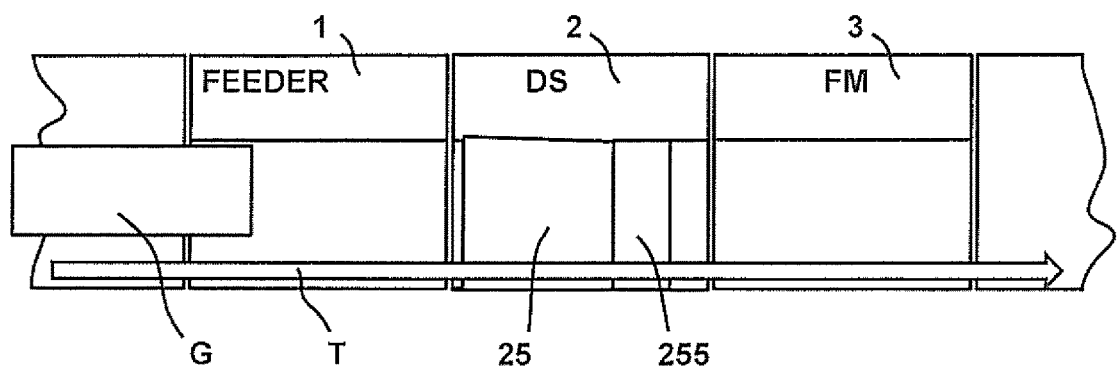
FIG. 1 is a plan view of a simplified, schematic arrangement of stations of a known goods processing system.

FIG. 1 shows a plan view of a simplified, schematic arrangement of stations of a known goods processing system. A flat good G is transported along a transport path T and traverses multiple stations of the goods processing system. Multiple flat goods that are transported in succession are also referred to as a goods flow. A first station 1 precedes—is upstream of in terms of the goods flow—a second station 2, the dynamic scale (DS). A third station 3 is arranged downstream in terms of the goods flow, thus after the dynamic scale in the transport path. The system velocity is the transport velocity of the flat goods upon changing to the next station.

For example, in a franking system, the first station 1 is an individualization station to automatically supply (FEEDER) individualized flat goods, and the third station 3 is a franking machine (FM). Stations 1, 2 and 3 respectively have a transport device. Station 2 has at least one transport belt 253. The transport velocity in the transport direction x is increased or reduced within the stations, or is at least equal to the system velocity. The latter is 530 mm/sec. Each station is in the position to draw a flat good G from the preceding station and transport it further.

Figure 2:
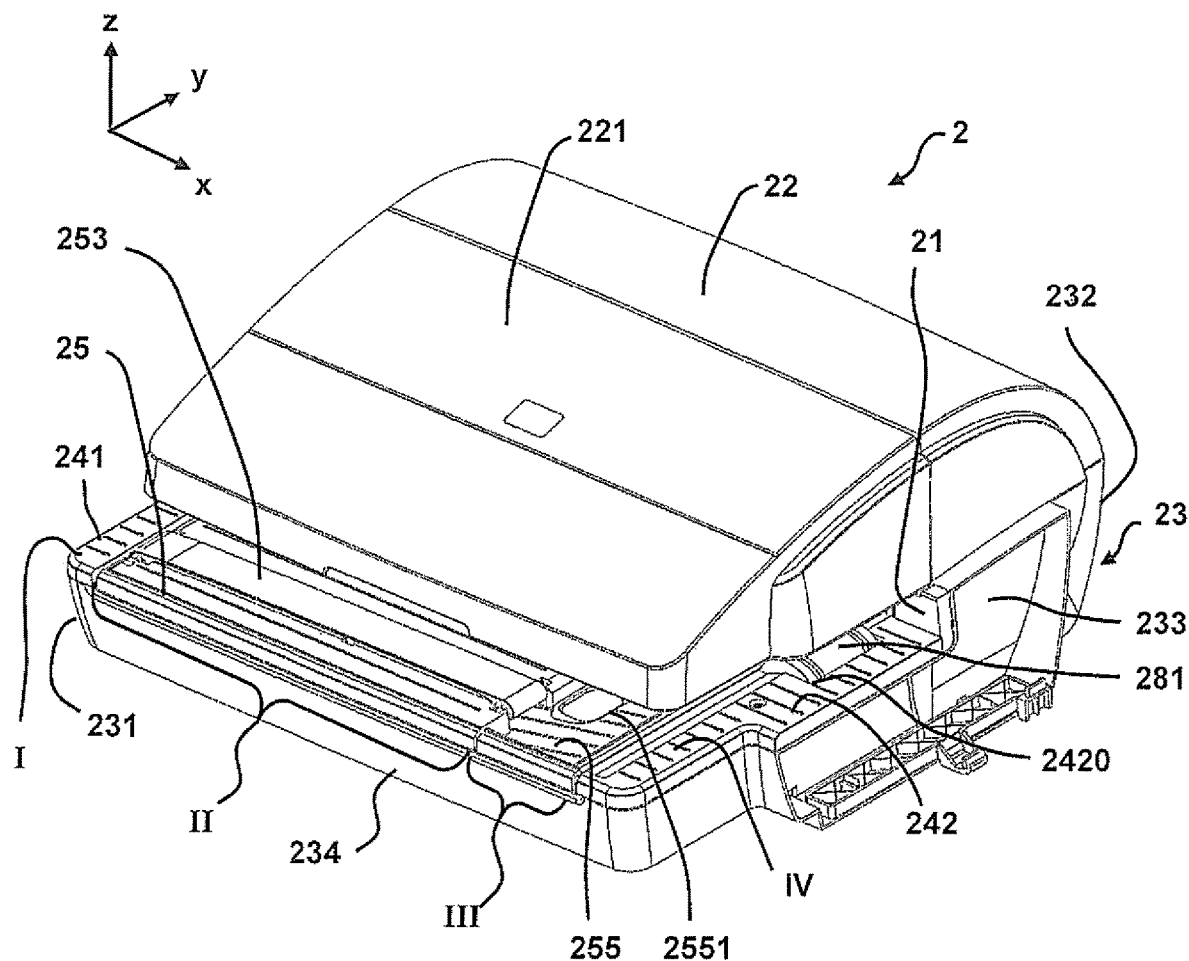
FIG. 2 is a perspective depiction of a dynamic scale for flat goods situated on their sides, from the upper right front.

FIG. 2 shows a perspective depiction of a dynamic scale 2 for flat goods situated on their side, from the upper right front. An upper housing shell 22 is equipped with a hinged, transparent hood 221 and placed on a lower housing shell 23 which has two side walls 231, 233, a rear housing wall 232, and a forward wall 234. A supply deck 24 is installed on the lower housing shell 23 at the input side and at the output side, in terms of the flow of goods.

Figure 3:
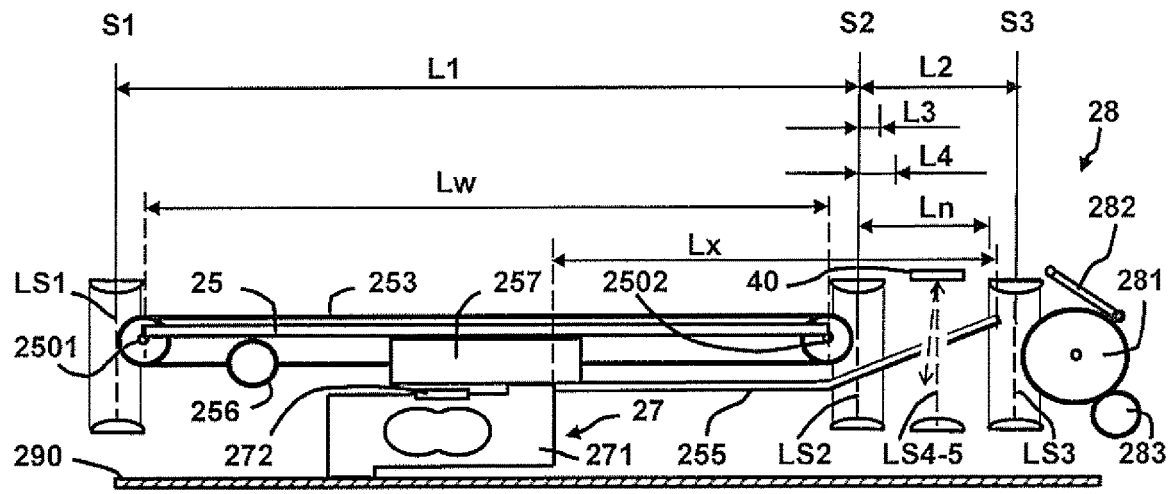
FIG. 3 is a simplified, schematic view of a dynamic scale from the front, in a first operating phase before the start.

A supply deck 24 is comprised of a first subsection I at the input side, in terms of the flow of goods, and a fourth subsection IV at the output side, in terms of the flow of goods, which first and fourth subsection are separated from one another by a second section II and third section III, wherein the weighing plate 25 is arranged in the second section II and a covering 255 for a width sensor, said covering 255 being installed at the weighing plate, is arranged in the third section III. One transport belt 253 of a plurality of transport belts is arranged on the weighing plate 25, next to the forward wall 234 of the dynamic scale 2. In the third section III, at least one first window opening 2551 is provided in the covering 255 of the width sensor, which first window opening 2551 extends in the y-direction and begins downstream of the transport area of the third transport belt 253. The subsection I at the input side, in terms of the flow of goods, or the subsection IV at the output side, in terms of the flow of goods, of the aforementioned supply deck 241 or 242 are situated at approximately the same height above a base plate 290 (FIG. 3). An alignment wall 20 (not visible) bounds the first subsection I of the supply deck in the y-direction, and an alignment wall 21 bounds the fourth subsection IV of the supply deck in the y-direction. The alignment wall 20 at the input side, in terms of the flow of goods, is arranged at a somewhat smaller distance from the tangent t than the alignment wall 21 at the output side, in terms of the flow of goods. The first subsection I at the input side, in terms of the flow of goods, and the fourth subsection IV at the output side, in terms of the flow of goods, of the aforementioned supply deck 24, as well as the covering 255 for the width sensor, also have additional window openings for a plurality of sensors. These sensors are covered by the upper housing shell 22 in the depiction according to FIG. 2. Installed on the upper housing shell 22 is a folding hood 221 made of a transparent material. The subsection IV of the supply cover 241 has an opening 2420 for an ejection roller 281 of the takeoff device.

Shown in FIG. 3 is a simplified schematic view of a dynamic scale from the front, in a first working phase before the start of the transport of flat goods by means of the transport belts of the dynamic scale. The sensors S1, S2, S3 are arranged along the transport path and are preferably designed as photoelectric barriers LS1, LS2, LS3. During operation, the light rays form the photoelectric barriers LS1, LS2, LS3 between the receiver parts or a transmitter part of the sensors S1, S2, S3 if no light beam is interrupted by a flat good. The first photoelectric barrier LS1 is situated at a first distance before a drive shaft 2501 of the first deflection rollers, opposite to the transport direction x. The second photoelectric barrier LS2 is situated at a second distance after a drive shaft 2502 of the second deflection rollers, in the transport direction x. A length L1 is that of a subsection of the transport path that is situated between the sensors S1 and S2. A length L2 is situated between the sensors S2 and S3. The length of a subsection of the transport path that is situated between the drive shaft 2501 of the first deflection rollers and the drive shaft 2502 of the second deflection rollers is the effective length Lw of the weighing plate. An attachment location of the covering 255 of the width sensor is situated upstream of the drive shaft 2502 in terms of the flow of goods. The covering 255 has a maximum length Lx in the transport direction x. The lengths L2, L3, L4, . . . , Ln begin at the sensor S2 and likewise extend in the transport direction x, wherein L3<L4< . . . <Ln<L2 applies.

The first sensor S1 is designed as a photoelectric barrier LS2 and serves to detect the leading edge and the trailing edge of a flat good (letter) immediately before the input of the weighing plate. The second sensor is also designed as a photoelectric barrier LS2 and serves to detect the leading edge of the letter immediately after the output of the weighing plate.

The third sensor is likewise formed as a photoelectric barrier LS3 and serves to detect the leading edge of the letter at the end of the weighing plate. The transmitter/receiver components of the third photoelectric barrier LS3 are arranged in a retention plate 2973 in the transport path, immediately before the ejection roller 281. The third sensor is located near to a shaft of the ejection roller 281 that, together with the contact pressure mechanism 282 formed by at least one contact pressure finger, is arranged at the output of the dynamic scale.

Figure 4A:
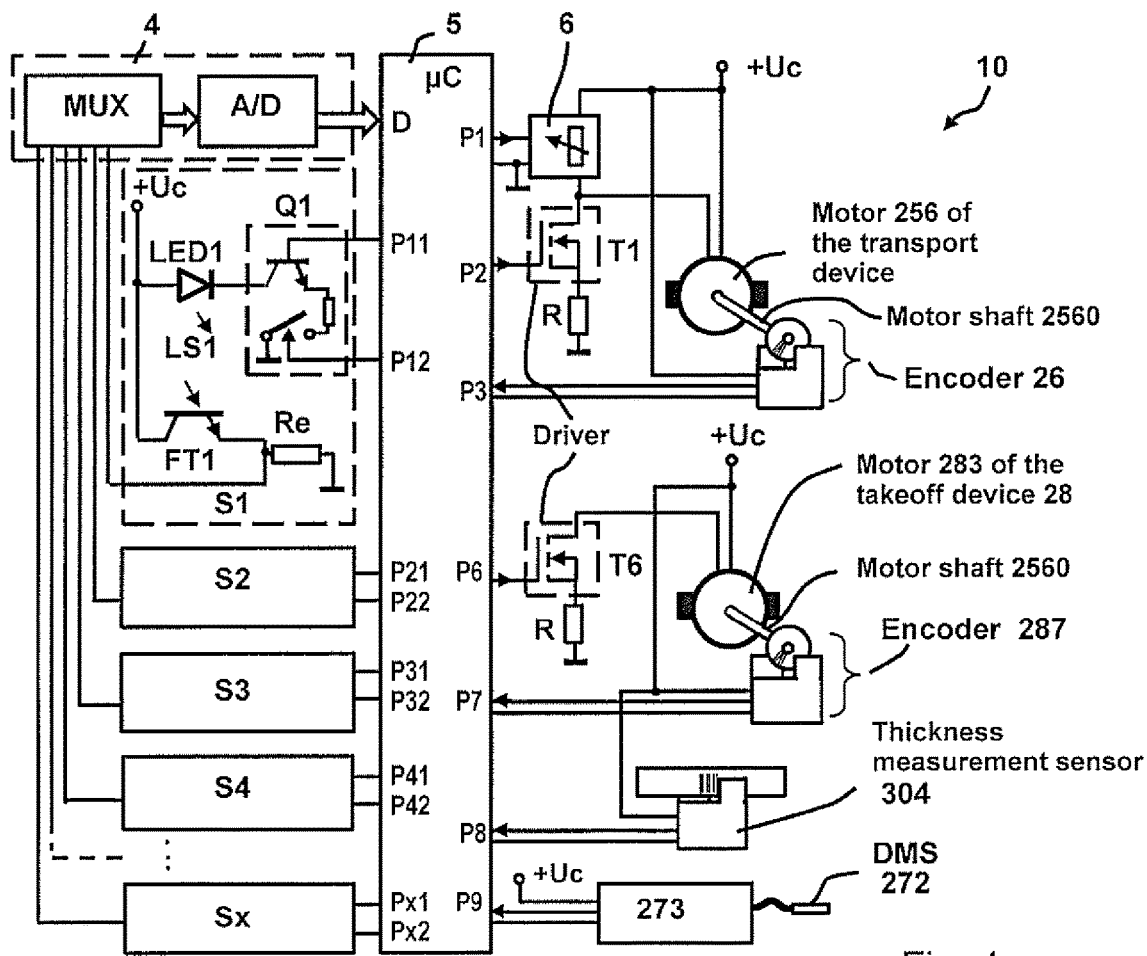
FIG. 4$a$ is a simplified diagram of a first embodiment of the control computer.

The first motor 256 is arranged (the manner is not shown) in a bay of a frame 257 below the weighing plate 25, and acts via a belt power train (not shown) on a respective first deflection roller of each transport belt, said deflection roller being arranged at the input side, in terms of the flow of goods, on the weighing plate. The first motor has a motor shaft that is connected with an encoder wheel of an encoder (FIG. 4a). The first motor 256 acts (the manner is not shown) on a power train to commonly drive a number of driven transport belts. The frame 257 is installed on a weighing cell 27. The latter is arranged on the base plate 290 of the chassis. The weighing cell 27 is comprised of a double bending beam elastic body 271 and a strain gauge strip (DMS) 272.

A second motor 283 is arranged on the takeoff device and drives (the manner is not shown) the shaft of the ejection roller 281 via toothed belts and a toothed pulley power train. In the simplified view according to FIG. 3, a first assembly for thickness measurement and an electronic circuit are omitted, wherein an electronic circuit arrangement is explained in detail in the following, in FIG. 4a, as a simplified connection diagram of the control unit, and is electrically connected with each of the receiver parts and transmitter parts of a photoelectric barrier. The electronic circuit arrangement may, for example, be arranged on a mainboard and be provided in order to achieve an increased immunity to the influence of outside light on optical sensors (FIG. 5).

A second assembly is provided for letter width measurement. The second assembly has receiver parts and transmitter parts for a plurality of photoelectric barriers and, for example, a spindle to adjust the measurement position to the respective format boundary of interest. That is required since different formats also apply in different countries, and thus a country-specific adjustment is easily possible. Each width sensor is preferably executed as a reflection sensor, wherein the light beams of the photoelectric barriers LS4-5 are reflected at a reflective foil 40. The reflective foil 40 is arranged on the inside of the hood 221, opposite the position of the receiver parts and transmitter parts of the width sensor.

The weighing of each flat good is begun as soon as the good rests individually and entirely on the weighing region. "Individually" in this context means an operating state of the scale in which no additional flat good is also located in the weighing region.

The distance between the light beams of the first and second photoelectric barrier reaches a first length L1 of 306 mm. The length of the weighing pan is approximately 300 mm, for example. The weighing region is preferably optimized for the dynamic weighing of standard letters of DIN format C5 (16.2 cm×22.9 cm) and is bounded by the photoelectric barriers LS1 at the input and LS3 before the output of the dynamic scale. That corresponds to a subsection of the transport path of a maximum length Lmax=L1+L2=382 mm.

The light beam forms between the receiver parts or a transmitter part of the respective sensors. In other words: the photoelectric barrier is clear. The second photoelectric barrier LS2 is situated between the photoelectric barriers LS1 and LS3 and is a subsection of the transport path having a second length L2=75.73 mm, arranged at a distance from the photoelectric barrier LS3. A standard letter of DIN format C5 (16.2 cm×22.9 cm) that is moving in the transport direction x first closes the photoelectric barrier LS1 with its leading edge and subsequently clears photoelectric barrier LS1 with its trailing edge again, before it reaches photoelectric barrier LS2 with its leading edge. The standard letter is thereby moved further on the weighing plate, onto a subsection of the transport path of 306 mm−229 mm=77 mm, with a first transport velocity V1=520 mm in the transport direction, and is simultaneously weighed. A throughput of approximately 100 standard letters per second may thereby be achieved.

The light beam is interrupted if the standard letter covers the photoelectric barrier LS2. In other words: the photoelectric barrier closes. A check is now performed as to whether a stable weight measurement value is present. However, if the standard letter to be weighed closes the photoelectric barrier LS2 with its leading edge and a stable weight measurement value is not yet present, the transport velocity is reduced step-by-step, and a braking process is possibly initiated that is implemented so that the flat good ultimately comes to a halt so that its leading edge does not yet cover the photoelectric barrier LS3, meaning that it has not yet left the weighing platform.

The weight determination continues to run during the transport velocity reduction or braking process. If this leads to a successful determination of a weight for this letter, the transport velocity reduction or braking process is terminated, and the flat good is accelerated again to the given system velocity. In the event that it is not, a static weight measurement is implemented after the termination of the braking process, and the flat good is only increased to the transport velocity again in order to be able to be transported further to station 3 at system velocity.

The control unit of the dynamic scale is electrically connected with both motors in order to transfer to these the activation signals of a control method of the dynamic scale. The transport velocity process takes place path-controlled via the encoder of the transport belt drive, in at least a few rough stages. For example, due to the mass inertia of the flat good, at a transport velocity $V_T$=530 mm/sec before a transport velocity reduction or a braking, and for the given distance L2=75 mm between the photoelectric barriers LS2 and LS3, given a very low friction between the good and the transport belt it has proven to be advantageous to perform the transport velocity reduction or braking so that the velocity is reduced to zero at the latest 55 mm after the leading edge of the flat good has passed the photoelectric barrier LS2, so that the letter safely comes to a stop before LS3. For a step reduction of 530 mm/sec to 0 mm/sec in six stages, a step sequence therefore results according to Table 1:

| Stage | Position Leading Letter Edge | Step Velocity | Duration |
|---|---|---|---|
| 1 | LS2 close + 0 mm | 442 mm/sec | 0.023 sec |
| 2 | LS2 close + 11 mm | 354 mm/sec | 0.030 sec |
| 3 | LS2 close + 22 mm | 266 mm/sec | 0.040 sec |

-continued

| Stage | Position Leading Letter Edge | Step Velocity | Duration |
|---|---|---|---|
| 4 | LS2 close + 33 mm | 178 mm/sec | 0.060 sec |
| 5 | LS2 close + 44 mm | 90 mm/sec | 0.080 sec |
| 6 | LS2 close + 55 mm | 0 mm/sec | ∞ sec |

Figure 6:
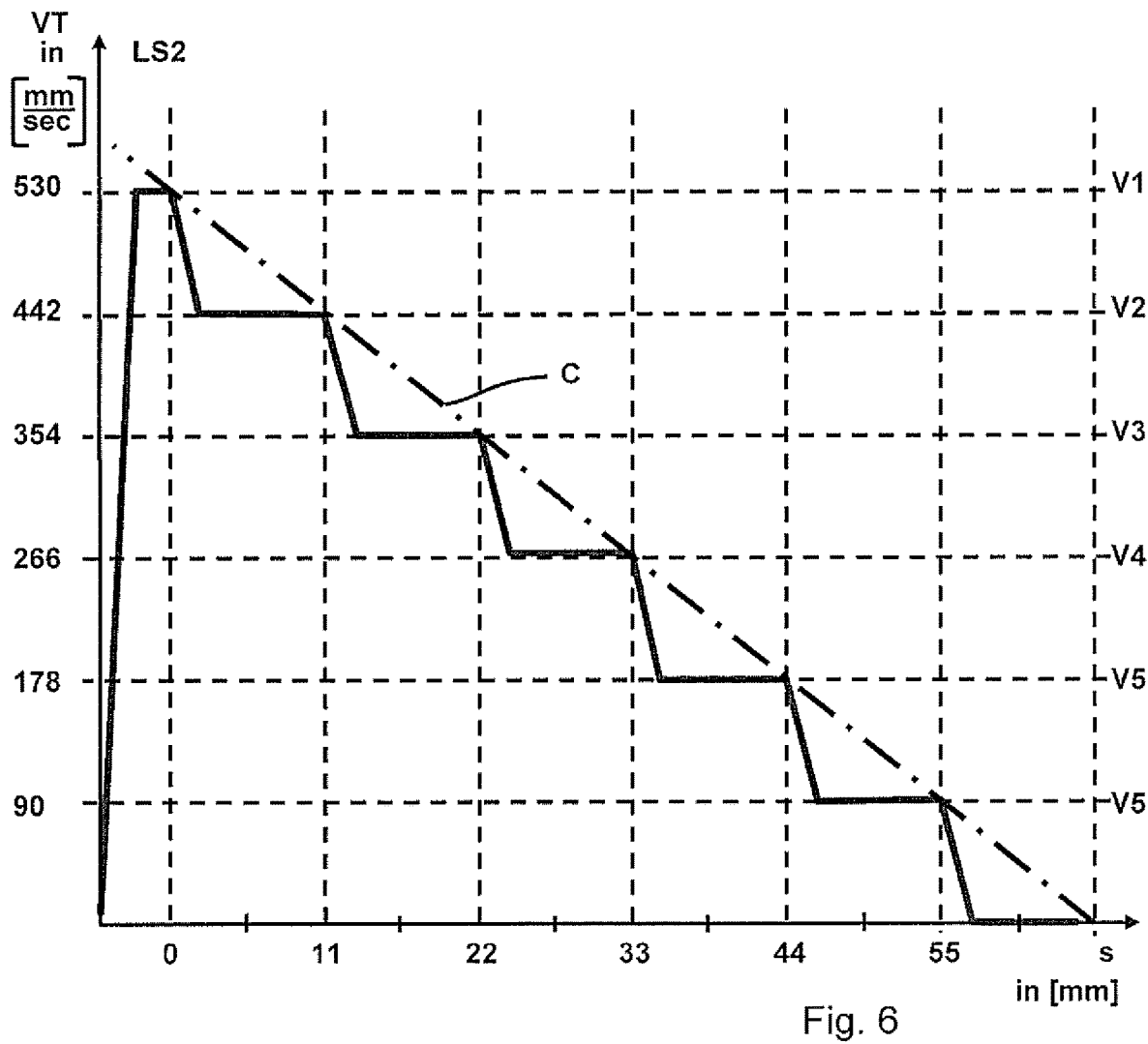
FIG. 6 shows a simplified velocity/path diagram.

The values from Table 1 are depicted in a simplified velocity/path diagram in FIG. 6. The ordinate indicates the transport velocity $V_T$ in mm/sec, and the abscissa indicates the path length s in mm as of the photoelectric barrier LS2, in the transport direction. After the start, the transport velocity V1=530 mm/sec is achieved and the flat good is transported in the transport direction at constant transport velocity V1. If the photoelectric barrier LS2 closes, the transport velocity is changed to the transport velocity V2 of the next lowest step etc. if no valid weight measurement result is present. In the limit case, the transport device is halted at a lowermost step of the stepped function curve, and the moving flat good comes to a standstill. A uniform decrease from the transport velocity of 530 mm/sec, by 88 mm/sec per step at the next lowest step velocity per step, is apparent from FIG. 6. A "uniform" decrease means that an envelope C applied to the steps has a linear function, thus corresponds to a straight line with linear curve according to Equation (1):

$$V_T = -m \cdot s + 530 \text{ mm/sec} \quad (1)$$

The path s is indicated in mm, and the average negative slope m is indicated in 1/sec, such that a decrease of the straight envelope line in a magnitude of m=8 mm/sec results from each step of the transport velocity.

A reduction of the transport velocity to a next lowest step may take place in 0.08 to 0.1 sec via a downward adjustment without braking. The duration indicated in the above Table 1 results from a downward adjustment with additional active braking. The transport velocity may also be reduced significantly more quickly by an active braking to a next lowest step. More measurement time, during which the flat good is transported with a constant transport velocity V1, V2, V3, V4 or V5, is thus available per step. In the following exemplary embodiment, the next lowest step is achieved within 0.01 sec.

The flat good requires a time ts1=0.023 sec to traverse a first step, for example, wherein the transport velocity is reduced from V1=530 mm/sec to V2=442 mm/sec in approximately a hundredth of a second in a first step, wherein the good is transported approximately 5 mm further and, after this traveled path segment on the transport belt, arrives at a first step of the transport velocity $V_T$=V2=442 mm/sec, and subsequently is transported an additional 6 mm path segment with a constant transport velocity V2.

If the flat good were to be transported further with a constant transport velocity V2 after decreasing the transport velocity from V1 to V2, a longer duration would already extend than would be available as a measurement time. However, the system changes back to the higher step if a valid weight measurement result is already present before the end of the first step (FIG. 7b).

Overall, a duration of ts2=0.03 sec is required for a traversal of a second step, for example. Overall, a duration of ts3=0.04 sec is required for a traversal of a third step, for example. Overall, a duration of ts4=0.06 sec is required for a traversal of a fourth step, for example. Overall, a duration of ts5=0.08 sec is required for a traversal of a fifth step, for example. Overall, a total duration tsover=ts1+ts2+ts3+ts4+ts5=0.23 sec results for a traversal of all five stages given a transport velocity $V_T \neq 0$ reduced uniformly in steps. The measurement time available for a weight measurement is thus increased by an order of magnitude relative to the first step via an additional step reduction.

The available measurement time for the traversal of a step consequently increases non-linearly from step-to-step. A traversal of a sixth step at $V_T=0$ mm/sec may theoretically have a duration of infinite length. For this reason, a time limit was installed which terminates the weight measurement after a predetermined time. Even if a count of six steps is assumed in the preceding example, it should not therefore be precluded that a smaller number of steps would be possible, for example four steps (FIG. 7c). If necessary, however, a "finer" step reduction may also be performed in order to realize a "more uniform" decrease of the transport velocity.

Alternatively, a non-linear envelope might also be accommodated by an appropriate step change. For example, the available measurement time for the traversal of a step may increase linearly from step-to-step.

A number of different curve paths are also conceivable as an envelope. A nonlinear envelope may thus be realized that increases the available measurement time for the traversal of a step nonlinearly from step-to-step.

FIG. 4a shows a simplified connection diagram of the control unit according to a first variant. The connection diagram of the control unit 10 of the dynamic scale has a computer 5 having a digital data input D that is electrically connected with the digital output of an input circuit 4. The input circuit 4 contains a multiplexer and an A/D converter, wherein the analog outputs of all sensors S1, S2, . . . through Sx are connected to the analog inputs of the multiplex, and the analog output of the multiplexer is connected with the analog input of the A/D converter. The sensors are all in principle of identical construction and respectively have a light emitter and a light receiver. The light receiver has an npn-phototransistor with its emitter is at ground potential via an input resistor Re, and whose collector connected to operating voltage +Uc. At the input resistor Re, a voltage drops whose level varies depending on the exposure strength of a light beam that strikes the base of the npn-phototransistor.

Via the multiplexer of the input circuit 4, the input voltages of the sensors are polled in succession and transformed via the A/D converter into a digital value.

The computer 5 has an analog output on PIN P11 and a digital output on PIN P12 in order to activate a current source Q1 of the first sensor, wherein a direct voltage is applied to the base of an npn-transistor via the analog output at PIN P11 to control the current source. Connected in series between ground and the emitter of the npn-transistor are an electronic switch and an emitter resistance, such that a direct voltage decreases at the emitter resistance, which produces a constant current flow through the emitter resistance if the electronic switch activated by the digital output at PIN P12 is connected to a current passage. A light-emitting diode (LED1) is connected on one side to the collector of the npn-transistor, and on the other side to operating voltage +Uc. A constant direct current thus flows through the light-emitting diode (LED1) and causes this to emit a light beam if the electronic switch is connected to a current passage.

The computer 5 has additional analog outputs at PINs P21, P31, P41, . . . , Px1 and additional digital outputs at PINs P22, P32, P42, . . . , Px2 in order to be able to activate sensors S2, . . . through Sx. The computer 5 additionally has an analog output at PIN P1 in order to activate an electronically controllable resistance of a brake circuit 6 as needed, the resistance of which is connected parallel to the impedance of the motor 256 of the transport device.

The computer 5 has additional digital outputs on PINs P2 and P6 in order to apply respective pulse width-modulated pulses to a control input of the respective driver T1 and T6. MOSFETs whose source is connected to ground via a resistor R and between whose drain and the operating voltage +Uc a motor 256, 287 is respectively switched are preferably used as drivers; direct current motors are preferably used. The motor 256 of the transport device has a motor shaft 2560 with an encoder wheel for an encoder 26. The motor 283 of a takeoff device 28 likewise has a motor shaft 2830 with an encoder wheel for an encoder 287. A connection line of the encoder and a thickness measurement sensor 304 are respectively connected to ground, and an additional connection line is respectively connected to operating voltage +Uc. The output of the encoder 26 is connected to PIN P3; the output of the encoder 26 is connected to PIN P7; and the output of a thickness measurement sensor 304 is connected to PIN P8 of the computer 5.

The encoder and the thickness measurement sensor 304 supply pulses that are counted and evaluated by the computer 5.

The analog output of the strain gauge sensor (DMS) 272 of the weighing cell 27 is electrically connected with an analog input of an electronic measurement value processing unit 273 that has, at the output side, a digital serial interface RS232. The output of the electronic measurement value processing unit 273 is connected to PIN P9 of the computer 5.

Figure 4B:
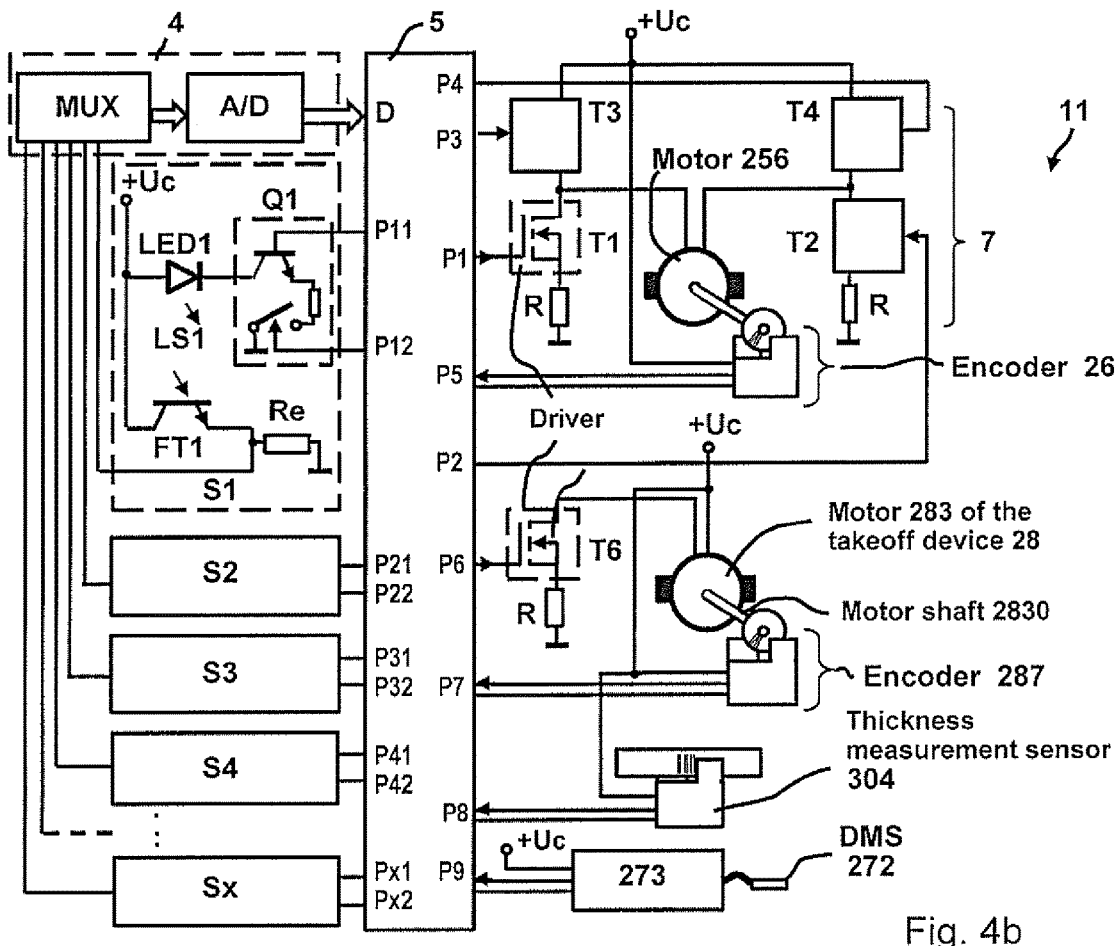

FIG. 4b shows a simplified connection diagram of the control unit according to a second variant. The connection diagram of the control unit 11 of the dynamic scale likewise has sensors S1, S2, . . . through Sx, two encoders 26 and 283, a thickness measurement sensor 304, and a computer 5 whose digital data input D is electrically connected with the digital output of an input circuit 4. The control unit contains the computer, which is soldered onto a mainboard or is a processor module plugged into the mainboard. The activation of the motor 283 of the takeoff device 28 takes place just as in the control unit 10 of the dynamic scale according to FIG. 4a. Only the braking circuit 6 of variant 1 was replaced by a bridge circuit 7 of variant 2. Bridge circuit 7 has four MOSFETs T1 through T4. The MOSFETs T1 and T2, which are arranged opposite one another in the bridge circuit, are activated simultaneously in the event that the motor 256 should be braked quickly. The energy stored in the motor is then conducted into the resistor R and transduced into thermal energy, which is then discharged to the environment.

In an additional variant (not shown in detail) of the control unit, the bridge circuit, integrated into a computer chip, is arranged on a mainboard.

FIGS. 5a, 5b, 5c and 5d show a simplified, schematic workflow diagram for the control unit of the dynamic scale. The routine 100 to control the dynamic scale begins in the start step 101 so that all stations 1, 2 and 3 of the goods processing system (FIG. 1), and possibly additional peripheral devices, are activated.

In step 102, the motor 256 is activated by the computer to start driving the transport device of the dynamic scale 2 corresponding to pulse width-modulated pulses, in order to achieve the desired transport velocity V1 for flat goods and in order to keep this approximately constant via a motor rotation speed regulation. A counting of the encoder pulses of the encoder 26 is also started in step 102. In step 102, a number of sub-steps (FIG. 5d) is started that are necessary for evaluation of the sensor signals, which sub-steps run continuously in the background, in parallel with the routine 100, and are cyclically repeated.

In a query step 103, whether the photoelectric barrier LS1 of the first sensor S1 has been closed by a leading edge of a flat good is subsequently determined by the computer. If the query of whether the photoelectric barrier LS1 detects [the] leading edge of a flat good G1 can be answered affirmatively in query step 103, the workflow branches to step 104 and at least one of the dimension measurements is started. The thickness of a good may thus be determined by means of the thickness measurement sensor, and additional dimensions (length, width) of the good may be determined by means of sensors that are not shown in detail. Such dimension measurements may run in the background of the routine 100. Moreover, the dynamic scale may be tared automatically before the start of the dynamic weighing process of the first flat good, and thus may be calibrated to a weight value without a flat good, which corresponds to the weight value of zero Newtons. The workflow branches back to the beginning of step 103 if that is not the case, thus if the question in the query step 103 must be answered in the negative.

After step 104, in a following query step 105 it is determined by the computer whether the photoelectric barrier LS1 of the first sensor S1 has been cleared by a trailing edge of a flat good. Naturally, the trailing edge may only be detected when the flat good rests entirely on the weighing plate. The photoelectric barrier LS1 will clear first if the flat good is a short good, thus standard letters. Otherwise, the photoelectric barrier LS2 will close first if the flat good is a long good, thus letters of the largest format. Therefore, the workflow branches from the query step 105 to the next query step 107 if the question of query step 105 must be answered in the negative. However, the workflow branches to step 106 if the question of query step 105 is answered positively. In step 106, weight measurements of the flat good are begun or implemented by the weighing cell 27 of the dynamic scale. Such weight measurements may run in the background of the routine 100 for controlling the dynamic scale. From step 106, the workflow branches to query step 107. In query step 107, a check is performed by the computer as to whether the photoelectric barrier LS2 has already been closed. If that is not the case, the workflow branches back from the last query step 107 to the beginning of query step 105. This loop may be traversed many times until the leading edge of the flat good G1 is detected by the photoelectric barrier LS2 in cooperation with the computer. In this instance, the photoelectric barrier LS2 is closed and the workflow branches from the routine 100 to a query step 108 in order to establish whether a valid weight measurement result has in the meantime become present. If a valid weight measurement result is present, the workflow then branches to step 124 in order to further control the motor 256 of the transport device so that the flat good is transported further in the transport direction with a constant transport velocity. Otherwise, the workflow branches to step 109 when no valid weight measurement result is present.

The counting of the encoder pulses of the encoder 26 that was started in step 102 has in the meanwhile lead to a first count state W1, and in step 109 the count state W1 is now stored in a memory of the computer. In the routine, a program point a is reached. The subsequent step 110 is presented in simplified form and characterized by a block with a dash-dot line. A more detailed depiction can be taken from FIG. 5c. In step 110, a number of weight measurements take place given a transport velocity reduced in steps. A check is thereby performed as to whether the weight measurement result is valid. In the event of a positive response, a program point c is reached and the workflow branches again to step 124. In the event of a negative response, a program point b is reached and the workflow then branches to step 121. In this, an additional downward adjustment of the transport velocity takes place until the transport device is halted, wherein the downward regulation may be combined with a braking until the flat good is stopped. In the following query step 122, a check is subsequently performed as to whether a valid weight measurement result has been produced within a predetermined time period. In the positive case, the workflow branches to step 124 again. Otherwise, in step 123 the output of an error message takes place, and only following this does the workflow branch back to step 124 again. A query step 125 is subsequently reached, and a check is made as to whether the leading edge of the flat good has reached the third photoelectric barrier LS3. The routine 100 arrives at a program point d if this is positively the case and the leading edge of the good has closed the third photoelectric barrier LS3. Otherwise, the workflow branches back to the beginning of query step 125.

Figure 5D:
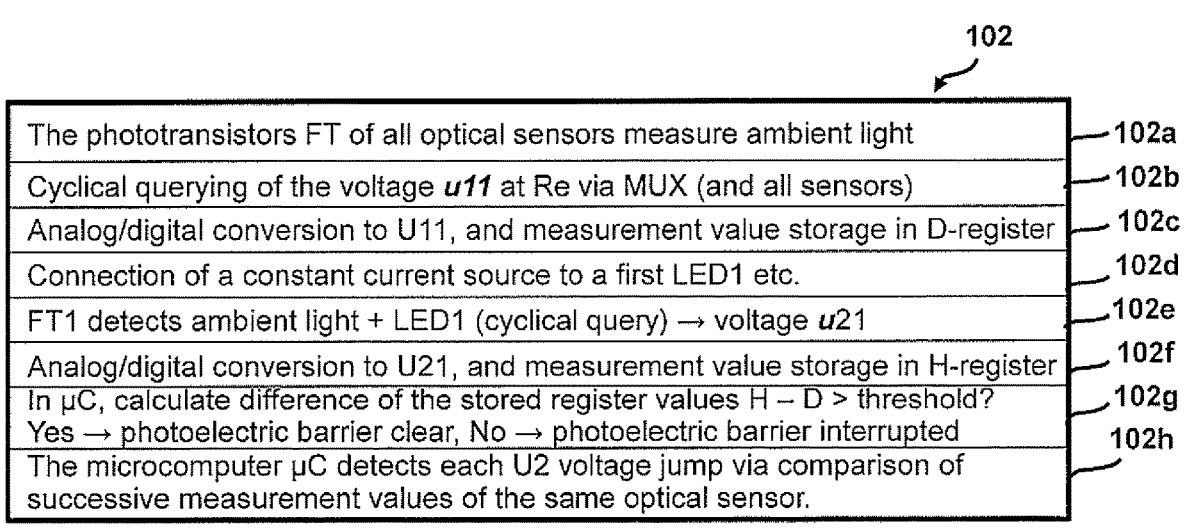
FIGS. 5$a$, 5$b$, 5$c$, 5$d$, collectively show simplified, schematic workflow plans.
Figure 5A:
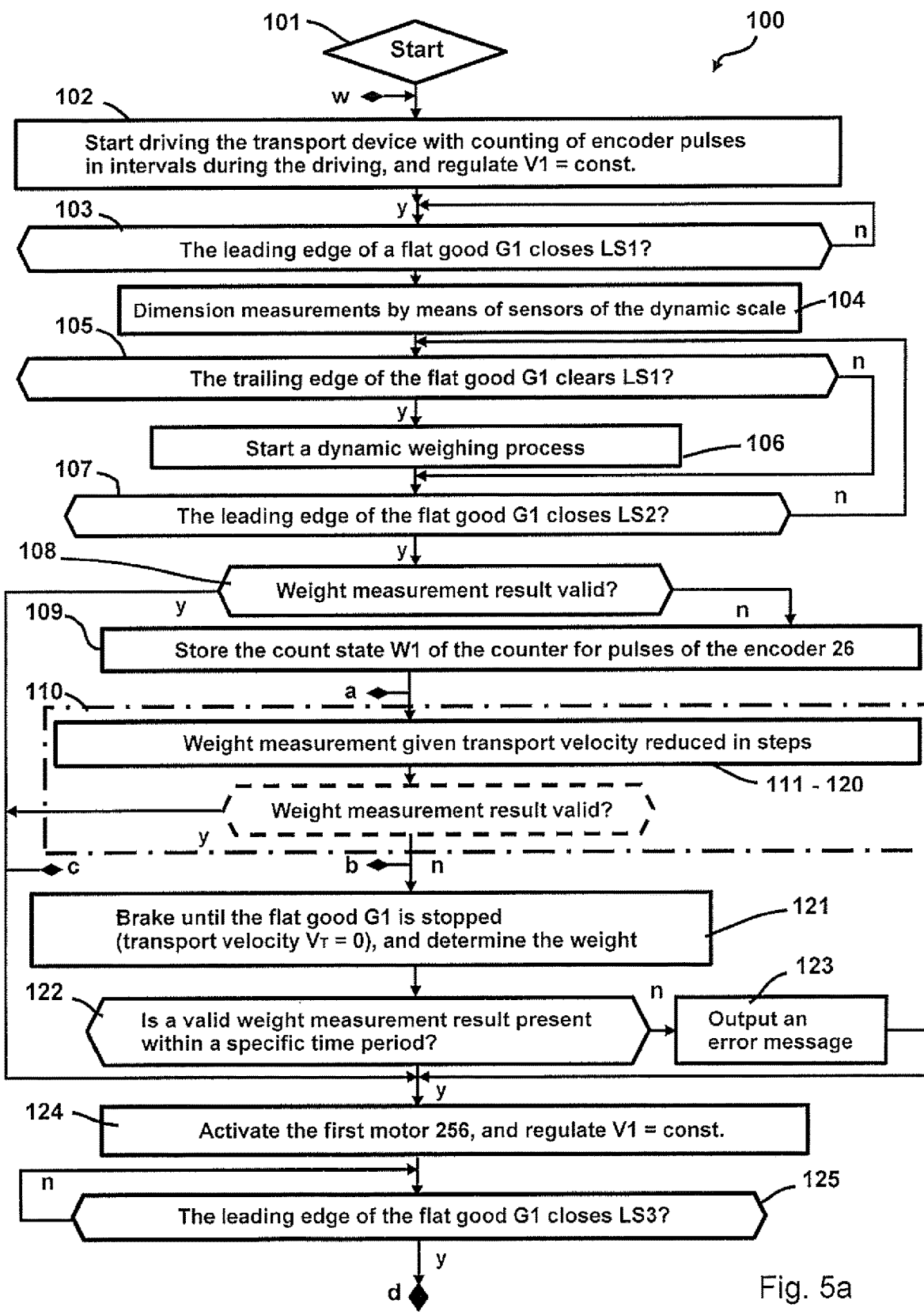
Figure 5B:
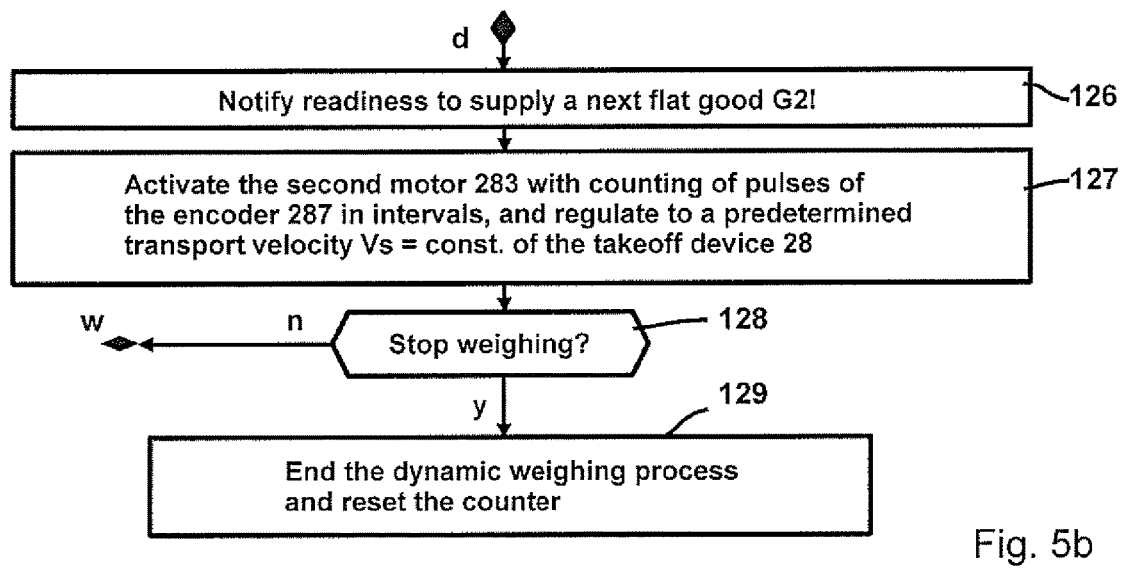

FIG. 5b shows the further workflow of the routine 100 as of the program point d. The leading edge of the flat good G1 has arrived well beyond the weighing area and should now be ejected from the dynamic scale. A second flat good G2 may be supplied to the dynamic scale. In step 126 of the routine, the readiness to supply a next flat good G2 is reported via a communication connection to the station 1 (FIG. 1) arranged beforehand in the transport path T.

In the following step 127 of the routine 100, an activation of the second motor 128 of the dynamic scale subsequently takes place. The second motor 283 serves to drive the ejection roller 218 of the takeoff device 28. The motor shaft 2830 is coupled with an encoder wheel of the encoder 287. The output of the encoder 287 is connected with the PIN P7 of the computer 5. The computer counts, in time intervals, the pulses of the encoder 287 in order to regulate the rotation speed of the second motor 283 so that a constant, predetermined transport velocity that is identical to the system velocity Vs is reached by the takeoff device 28. In the following query step 128, a check takes place as to whether a status of the scale or a corresponding command to stop the weighing are present. If that is not the case, in routine 100 a program point w is reached and the workflow branches back to the beginning of step 102 of the routine 100. Otherwise, the dynamic weighing process is ended and the counter is reset to an initial value.

Figure 5C:
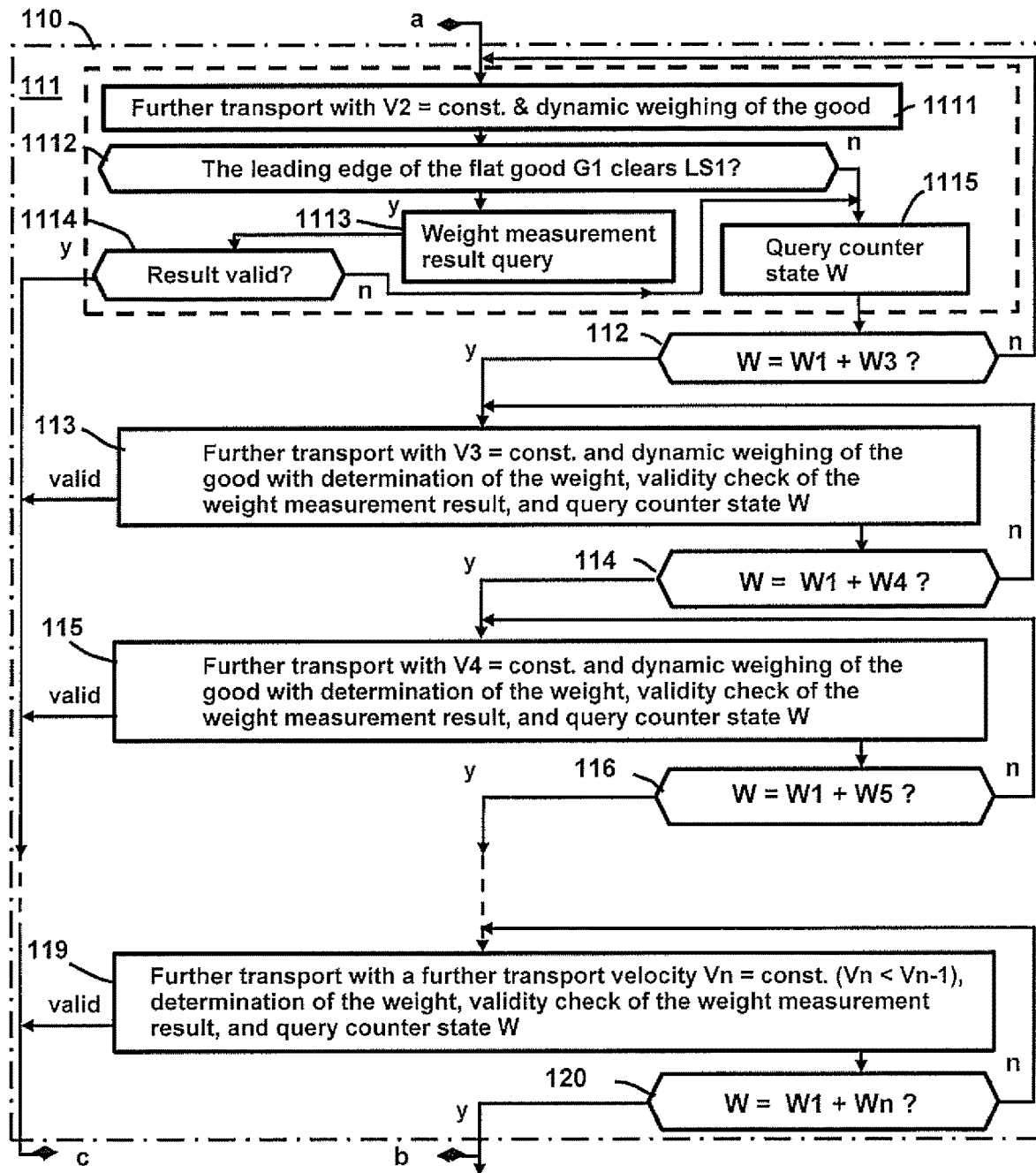

In a more detailed depiction, FIG. 5c shows a number of sub-steps of step 110 as of the program point a. In a sub-program 111 of the routine 100, the transport velocity is adjusted down from V1 to V2, and the sub-program is executed further by the computer. As a result of a first step 1111 of the sub-program, a further transport of the flat good now takes place with a constant transport velocity V2<V1. Dynamic weighing means that a further transport of the flat good occurs during the weighing. Given a large-format or long good, the second photoelectric barrier LS2 is normally closed first and the leading edge of the flat good G1 is detected by the computer, and only afterward is the second photoelectric barrier LS2 cleared and the trailing edge of the flat good G1 detected by the computer. In a query step 1112, a check is made as to whether the trailing edge of the flat good G1 has already reached the first photoelectric barrier LS1 and the photoelectric barrier LS1 has been cleared again. In a step 1113, a weight measurement result query takes place if the trailing edge of the flat good G1 has been detected. Otherwise, the workflow branches to step 1115 and the counter state W is queried. In a query step 1114 it is established whether the result of the weight measurement is valid. In the positive case, the workflow branches to a program point c of routine 100. Otherwise, the workflow branches to a step 1115. The subprogram 111 is subsequently abandoned and the workflow branches to a query step 112 of the routine 100, in which a check is made as to whether the sum of the stored counter state W1 and a predetermined count value W3 is equal to the queried counter state W. The length L3 of the transport path segment which is closest to the position of the second photoelectric barrier LS2 and follows this in the transport device x (FIG. 3), said length L3 being multiplied by a proportionality factor N, corresponds to the predetermined count value W3. The proportionality factor N is the number of encoder pulses per mm of path length s. The workflow branches back to the beginning of subprogram 111 in the event that the predetermined count value W3 has not yet been reached. Otherwise, the workflow branches to a subprogram 113. In a first step 1131 of the subprogram (not shown in detail), work is performed with a constant transport velocity V3<V2, after which the rotation speed of the motor is further reduced. A dynamic weighing of the good again takes place with a determination of the weight and a validity check of the weight measurement result. The current counter state W of the counter is also queried again if the weight measurement result is invalid, or if the first photoelectric barrier LS1 is not yet closed because the trailing edge of the flat good has not yet reached the first photoelectric barrier LS1. The first photoelectric barrier LS1 is cleared if the trailing edge of the flat good has passed the first photoelectric barrier LS1. A long, flat good then also lies entirely on the weighing pan, and the weight measurement may lead to a valid result. Given a valid result, the workflow branches from sub-program 113 to program point c of routine 100 again. Otherwise, given an invalid result, the workflow branches to a query step 114 of routine 100, in which a check is made as to whether the sum of the stored counter state W1 and a predetermined count value W4 is identical to the queried counter state W. The length L4 of the transport path segment, multiplied by a proportionality factor N, corresponds to the predetermined count value W4, wherein a path point is reached which is closest to the position of the previous path point that was reached by the leading edge of the flat good given a count value W3 and follows this in the transport direction x (FIG. 3). The workflow branches back to the beginning of the sub-program 113 in the event that the predetermined count value W4 has not yet been reached. Otherwise, the workflow branches to sub-program 115. The sub-program 115 and a subsequent query step 116 of the routine 100 in principle run just like the other sub-programs 111, 113, . . . , 119 and query steps 112, 114, . . . , 120 of routine 100. Only the predetermined transport velocities decrease step by step (Vn<Vn−1), and the predetermined count values W3 to Wn increase. The length Ln of the transport path segment, multiplied by N, again corresponds to the predetermined count value Wn, wherein the sum of W1 and Wn defines a path point on the transport path that is reached by the leading edge of the flat good.

Shown in FIG. 5d are sub-steps of step 102 of routine 100 that run continuously in the background, parallel to the routine 100, and are repeated cyclically. Given an evaluation of the sensor signals, the ambient light influence must be taken into account because the phototransistors FT of all optical sensors measure the light emitted by the LED of the light transmitter, and also the ambient light. According to sub-step 102a, however, the phototransistors FT of all optical sensors measure only the ambient light alone if the current source Q of the LED is deactivated, as was depicted in FIG. 4a for sensor S1 using Q1, LED1, FT1 and the input resistor Re. In a second sub-step 102b, a cyclical querying of the analog voltage u11 dropping at the input resistor Re takes place via a multiplexer MUX of the input circuit 4, and for the analog voltages u12 . . . u1x that drop at the input resistors Re of all sensors S1 through Sx. In sub-step 102c, the analog/digital converter of the input circuit 4 performs an analog/digital conversion of each of the analog voltages u12 . . . u1x into digital values U12 . . . U1x, and a measurement value storage takes place in a D-register of the computer 5. A connection of a constant current source Q1 to a first LED1 of sensor S1, and in series of the remaining constant current sources Q1 . . . Qx to the LEDs of the remaining sensors S2 through Sx, subsequently takes place in substep 102d in the event that the program workflow of routine 100 requires it. In sub-step 102e, the phototransistor FT1 now detects the sum of ambient light and the light of the LED1 as an analog voltage drop u21 at Re. That also takes place for the remaining analog voltage drops at Re of the remaining sensors if that is required by the program workflow of routine 100. A cyclical querying of the analog voltages u21 . . . u2x by the multiplexer MUX of the input circuit 4 then takes place. An analog/digital conversion into digital voltage values U21 . . . U2x, and the storage of their measurement values in an H-register, then take place again in sub-step 102f. In a subsequent sub-step 102g, the computer 5 performs a difference calculation on the stored register values, wherein the digital voltage values in the D-register are respectively subtracted from the digital voltage values in the H-register. The respective photoelectric barrier is clear if the difference (H-register values minus D-register values) results in a digital value that is greater than a digital threshold. Otherwise, the photoelectric barrier is interrupted. The computer 5 detects each U2 voltage jump via comparison of successive measurement values by the same optical sensor in sub-step 102h.

Figure 7A:
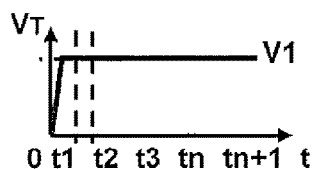
FIGS. 7$a$, 7$b$ and 7$c$ collectively show simplified velocity/time diagrams.
Figure 7B:
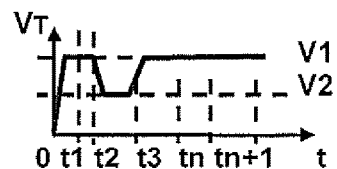
Figure 7C:
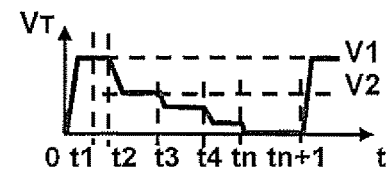

FIGS. 7a, 7b and 7c show simplified velocity/time diagrams which clarify the different workflows. In the normal case, the weight measurement is terminated before the flat good reaches the second photoelectric barrier LS2. While a valid measurement result may be achieved in a time period Δt=t2−t1 for a supplied short good (standard letter) so that the transport velocity may be maintained without a step reduction (FIG. 7a), a short measurement time is not sufficient in the remaining cases (FIGS. 7b and 7c) and must be extended.

The velocity/time diagram according to FIG. 7b shows a step reduction of the transport velocity from V1 to V2 before a valid weight measurement result may be achieved in a time period Δt=t3−t2. The transport velocity is subsequently increased again from V2 to V1.

The velocity/time diagram according to FIG. 7c shows a plurality of different and non-uniform step reductions of the transport velocity up to the halting of the transport device for flat goods.

In a deviation from the described workflow, the sub-programs may be realized in order to extend the measurement time by a suitable step reduction of the transport velocity.

If a letter or standard letter is discussed in the preceding, or if mail pieces are discussed, other flat goods should not therefore be excluded from the scope of protection.

If the sensors in the exemplary embodiment described in the preceding are optical sensors with a photoelectric barrier, nothing other than sensors designed as tactile sensors should therefore be excluded from the protective scope.

Although modifications and changes may be suggested by those skilled in the art, it is the intention of the Applicant to embody within the patent warranted hereon all changes and modifications as reasonably and properly come within the scope of the Applicant's contribution to the art.

The invention claimed is:

1. A method for controlling a dynamic scale through which flat items to be weighed proceed lying flat on their sides, said method comprising:
   with a control processor, controlling a transport device to transport the flat items through said dynamic scale while producing encoder pulses, and continuously counting said encoder pulses in a counter of said control processor;
   from said control processor, starting a weight measurement of an individual, moving flat item when a trailing edge of said individual, moving flat item reaches a first sensor, with storage of a count in said counter if the leading edge of said individual, moving flat item reaches a second sensor but a valid weight measurement result is not present in said control processor;
   if said individual, moving flat item reaches said second sensor with no valid weight measurement result being present in said control processor, reducing a transport velocity of said individual, moving flat item in a plurality of steps and, after a first step-down of said transport velocity, starting another weight measurement of said individual, moving flat item with the first stepped-down transport velocity;
   after starting said another weight measurement, querying a current counter state of said counter, and storing said current counter state, if neither a valid weight measurement result is present in said control processor nor a trailing edge of said individual, moving flat item has reached said first sensor with said leading edge of said individual, moving flat item having reached said second sensor;
   in said control processor, executing a check as to whether said current counter state corresponds to a sum of the stored counter state and a predetermined count value; and
   repeating stepped-down reduction of said transport velocity in successive step-downs, and repeating query and said check, as long as said current counter state has not reached said sum, and stopping said repeating if said current counter state reaches said sum.

2. A method according to claim 1, comprising:
   a) providing a weighing plate that has a transport device with which said flat items are transported in a transport direction x of a Cartesian coordinate system during the weighing, and counting said encoder pulses in time intervals during the transport in the transport direction;
   b) providing a takeoff device to take each individual, moving flat item off of the weighing plate;
   c) providing said first sensor in a first section of a supply deck in an intake of said dynamic scale, and sensors at an outlet of the dynamic scale, to detect flat items;
   d) providing a covering for a width sensor that forms a third section of the supply deck between the weighing plate and the takeoff device, said third section allowing the weighing plate to be shortened in a second section of the supply deck;
   e) configuring said control processor to:
      i) detect that the leading edge of each individual, moving flat item has reached a position of the first sensor, wherein the position of the first sensor lies directly at an edge of the weighing plate, upstream in terms of the flow of items in the transport direction x,
      ii) detect that the trailing edge of each individual, moving flat item has reached a position of the first sensor,
      iii) detect that the leading edge of each individual, moving flat item has reached a position of the second sensor, wherein the position of the second sensor lies directly at an edge of the weighing plate, downstream in terms of the flow of items in the transport direction x,
      iv) detect that the leading edge of each individual, moving flat item has reached a position of a third sensor, wherein the position of the third sensor lies directly at an edge of the weighing plate, downstream in terms of the flow of items in the transport direction x,
      v) activate a first motor of the transport device in order to transport each individual, moving flat item along the transport direction x with a first transport velocity $V1$, and monitoring operation of the first motor with an encoder,
      vi) count encoder pulses at time intervals during the driving of the transport device for each individual, moving flat item,
      vii) weigh and evaluate the weight measurement result, wherein given a valid weight measurement result the first motor of the transport device is activated in order to keep the first transport velocity $V1$ constant, and storing a first count state $W1$ of the counter upon determining an invalid weight measurement result,
      viii) make said another weight measurement at reduced transport velocity given an invalid weight measurement result, wherein the first motor of the transport device is activated in order to reduce the first transport velocity $V1$ by at least one step to at least a second transport velocity $V2$, and in order to subsequently hold this constant, and continuation of the weight measurement of each individual, moving flat item,
      ix) check whether a valid weight measurement result is present after the trailing edge of the each individual, moving flat item has reached the position of the first sensor, wherein the current counter state of the counter is queried if neither a valid weight measurement result is present nor has the trailing edge of the each individual, moving flat item reached the position of the first sensor,
      x) determine whether the current counter state of the counter corresponds to a sum of the stored first counter state and a predetermined count value, and repeat steps viii) and ix) of a weight measurement given a transport velocity reduced step-by-step given an invalid weight measurement result,
      xi) reduce the transport velocity to zero mm/sec, perform a static weight measurement, and emit an error message if no valid weight measurement result is present within a defined time period,
      xii) activate the first motor in order to transport each individual, moving flat item further in the transport direction x at the first transport velocity $V1$, and check whether the leading edge of each individual, moving flat item has reached the position of the third sensor, and xiii) send out a message to an individualization of the dynamic scale designating readiness for supply of a next item from an upstream supply station, and xiv) activate a second motor in order to drive a takeoff roller of the takeoff device to take a flat item off of the weighing plate.

3. A method according to claim 1, comprising configuring said control processor to, if the weighing is not stopped by command, branch back to (E)(I) after the activation of a second motor to drive the takeoff roller.

4. A method according to claim 1, comprising configuring said control processor to stop the transport if no valid weight measurement result may be achieved during a weight measurement given a transport velocity reduced step by step.

5. A method according to claim 4, comprising configuring said control processor to stop the transport via an active braking of the first motor.

6. A method according to claim 1, comprising configuring said control processor to reduce the transport velocity step by step via a rotation speed regulation.

7. A method according to claim 1, comprising configuring said control processor to reduce the transport velocity by a number of steps in order to produce a uniform decrease of the transport velocity, when said individual, moving flat item is an envelope, with a linear function.

8. A method according to claim 1, comprising configuring said control processor to reduce the transport velocity by a number of steps in order to produce a uniform decrease of the transport velocity, when said individual, moving flat item is an envelope, with a non-linear function.

9. A method according to claim 1, comprising configuring said control processor to reduce the transport velocity by a number of steps in order to produce a uniform decrease of the transport velocity, when said individual, moving flat item is an envelope, with a non-linear function.

10. A dynamic scale through which flat items to be weighed proceed lying flat on their sides, comprising:
a transport device with an encoder;
a control processor configured to control the transport device to transport the flat items through said dynamic scale while said encoder produces encoder pulses, said control processor having a counter that continuously counts said encoder pulses;
a weighing cell;
said control processor being configured to start a weight measurement of an individual, moving flat item by said weighing cell when a trailing edge of said individual, moving flat item reaches a first sensor, with storage of a count in said counter if the leading edge of said individual, moving flat item reaches a second sensor but a valid weight measurement result is not present in said control processor;
if said individual, moving flat item reaches said second sensor with no valid weight measurement result being present in said control processor said control processor being configured to reduce a transport velocity of said individual, moving flat item in a plurality of steps and, after a first step-down of said transport velocity, start another weight measurement of said individual, moving flat item with the first stepped-down transport velocity;
after starting said another weight measurement, said control processor being configured to query a current counter state of said counter, and store said current counter state, if neither a valid weight measurement result is present in said control processor and a trailing edge of said individual, moving flat item has reached said first sensor with said leading edge of said individual, moving flat item having reached said second sensor;
said control processor being configured to execute a check as to whether said current counter state corresponds to a sum of the stored counter state and a predetermined count value; and
said control processor being configured to repeat stepped-down reduction of said transport velocity in successive step-downs, and repeat said query and check, as long as said current counter state has not reached said sum, and stopping said repeating if said current counter state reaches said sum.

11. A dynamic scale according to claim 10, wherein:
said weighing cell comprises a weighing plate, and said transport device transports said flat items in a transport direction x of a Cartesian coordinate system during the weighing, and said control processor being configured to count said encoder pulses in time intervals during the transport in the transport direction;
a takeoff device to take each individual, moving flat item off of the weighing plate;
said first sensor being situated in a first section of a supply deck in an intake of said dynamic scale, and sensors at an outlet of the dynamic scale, to detect flat items;
a covering for a width sensor that forms a third section of the supply deck between the weighing plate and the takeoff device, said third section allowing the weighing plate to be shortened in a second section of the supply deck;
said control processor being configured to:
i) detect that the leading edge of each individual, moving flat item has reached a position of the first sensor, wherein the position of the first sensor lies directly at an edge of the weighing plate, upstream in terms of the flow of items in the transport direction x,
ii) detect that the trailing edge of each individual, moving flat item has reached a position of the first sensor,
iii) detect that the leading edge of each individual, moving flat item has reached a position of the second sensor, wherein the position of the second sensor lies directly at an edge of the weighing plate, downstream in terms of the flow of items in the transport direction x,
iv) detect that the leading edge of each individual, moving flat item has reached a position of a third sensor, wherein the position of the third sensor lies directly at an edge of the weighing plate, downstream in terms of the flow of items in the transport direction x,
v) activate a first motor of the transport device in order to transport each individual, moving flat item along the transport direction x with a first transport velocity V1, and monitoring operation of the first motor with the encoder,
vi) count encoder pulses at time intervals during the driving of the transport device for each individual, moving flat item,
vii) weigh and evaluate the weight measurement result, wherein given a valid weight measurement result the first motor of the transport device is activated in order to keep the first transport velocity V1 constant, and storing a first count state W1 of the counter upon determining an invalid weight measurement result, viii) make said another weight measurement at reduced transport velocity given an invalid weight measurement result, wherein the first motor of the transport device is activated in order to reduce the first transport velocity V1 by at least one step to at least a second transport velocity V2, and in order to subsequently hold this constant, and continuation of the weight measurement of each individual, moving flat item, ix) check whether a valid weight measurement result is present after the trailing edge of the each individual, moving flat item has reached the position of the first sensor, wherein the current counter state of the counter is queried if neither a valid weight measurement result is present nor has the trailing edge of the each individual, moving flat item reached the position of the first sensor, x) determine whether the current counter state of the counter corresponds to a sum of the stored first counter state and a predetermined count value, and repeat steps viii) and ix) of a weight measurement given a transport velocity reduced step-by-step given an invalid weight measurement result, xi) reduce the transport velocity to zero mm/sec, perform a static weight measurement, and emit an error message if no valid weight measurement result is present within a defined time period, xii) activate the first motor in order to transport each individual, moving flat item further in the transport direction x at the first transport velocity V1, and check whether the leading edge of each individual, moving flat item has reached the position of the third sensor, and xiii) send out a message to an individualization of the dynamic scale designating readiness for supply of a next item from an upstream supply station, and xiv) activate a second motor in order to drive a takeoff roller of the takeoff device to take a flat item off of the weighing plate.

12. A dynamic scale according to claim 11, wherein the takeoff device is next to the output of the dynamic scale, and has an ejection roller that is driven by the second motor, in order to produce the velocity V.

13. A dynamic scale according to claim 11, comprising an assembly that determines a length of each individual, moving flat item and an assembly that determines a thickness of each individual, moving flat item, at an input of the dynamic scale.

14. A dynamic scale according to claim 11, wherein the sensors are one-way photoelectric barriers.

15. A dynamic scale according to claim 11, wherein the sensors are tactile sensors.

* * * * *